F. J. Crissey,
Washing Machine.
Nº 25,247.     Patented Aug. 30, 1859.
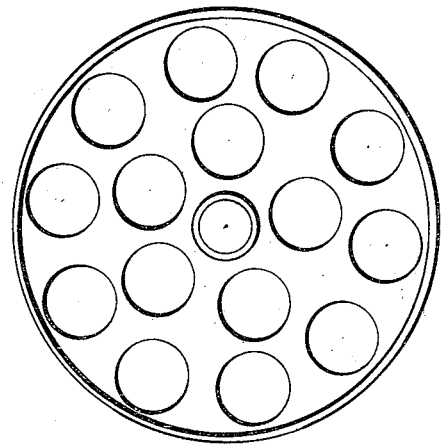
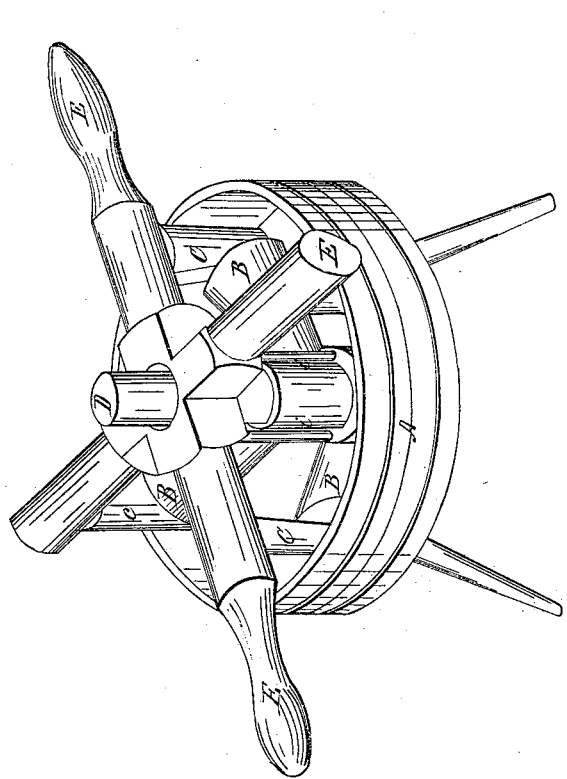
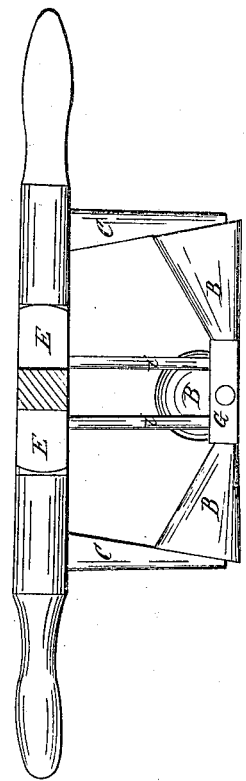

UNITED STATES PATENT OFFICE.

F. J. CRISSEY, OF LEESBURG, VIRGINIA.

WASHING-MACHINE.

Specification of Letters Patent No. 25,247, dated August 30, 1859.

*To all whom it may concern:*

Be it known that I, F. J. CRISSEY, of Leesburg, in the county of Loudoun and State of Virginia, have invented certain new and useful Improvements in Washing-Machines; and I do hereby declare the following to be a full, clear, and exact description of the same, reference being had to the accompanying drawings and the letters of reference marked thereon.

The nature of my invention consists in the combinations and arrangement of certain devices, the peculiarities of which will be hereinafter fully set forth.

To enable others skilled in the art to make and use my invention I will now describe its construction and operation.

In the drawings—Figure (1.) is a perspective view of the whole machine. Fig. (2.) is a view of the frame with the rollers attached. Fig. (3.) represents the bottom of the machine—which has interspersed at intervals, over its surface gradatory holes or cavities, said holes or cavities being deeper near its periphery and gradually becoming more shallow, as they approach the center. It would be advisable also to reduce the circumference of the holes or cavities as they approach the center.

In Fig. (1.) (A.) represents the ordinary form of wash-tub, in the center of which, is secured the upright shaft (D.).

(E) is a frame constructed by crossing two pieces at their centers, and firmly securing them; one of said pieces, is about the same length as the diameter of the tub, while the other being designed for the handle, extends over the sides of the tub, as fully shown in Figs. (1) and (2). Through the center of this frame a hole is bored, through which shaft (D.) extends.

(*c c c c*) are supports, which are secured within the circumference of the tub to frame (E.).

(G) is a collar, which encircles the lower part of shaft (D.), said collar is connected and secured to frame (E) by supports (*i i*).

(B, B.) are funnel shaped rollers, which are pivoted to supports (*c c c c*) and collar (G.). The large end of said rollers is just one-third of the circumference of the tub, and tapers to a pivot.

The operation of my machine is as follows: The frame (E.) being removed from shaft (D.), a sufficient quantity of water is put in the tub, and the articles to be washed are then placed around shaft (D.), and frame (E) again replaced; then by pressing on the handles, equally upon both sides, and revolving the rollers to and fro—the articles will be thoroughly washed without the slightest damage.

Having thus fully described my invention what I claim and desire to secure by Letters Patent is—

I claim the arrangement of frame E, supports *i, i*, upright shaft D, rollers B, B, supports *c, c, c,* and collar G, in combination with the bottom of the tub, when the parts shall be constructed and arranged in relation to each other as herein substantially set forth.

F. J. CRISSEY.

Witnesses:
R. BASSETT,
B. R. ATTWELL.